United States Patent
Cruz et al.

(10) Patent No.: US 9,242,431 B2
(45) Date of Patent: Jan. 26, 2016

(54) PATTERN LAMINATED DOUBLE WALL PLASTIC WEB FROM HEAT SHRINKABLE AND NON-HEAT SHRINKABLE FILMS

(71) Applicant: Curwood, Inc., Oshkosh, WI (US)

(72) Inventors: Tara K. Cruz, Appleton, WI (US); Tyler J. Theobald, Neenah, WI (US)

(73) Assignee: Bemis Company, Inc., Neenah, WI (US)

( * ) Notice: Subject to any disclaimer, the term of this patent is extended or adjusted under 35 U.S.C. 154(b) by 31 days.

(21) Appl. No.: 14/077,412

(22) Filed: Nov. 12, 2013

(65) Prior Publication Data

US 2015/0132546 A1    May 14, 2015

(51) Int. Cl.
| | |
|---|---|
| B65D 81/00 | (2006.01) |
| B65D 85/00 | (2006.01) |
| B65D 75/00 | (2006.01) |
| B32B 7/14 | (2006.01) |
| A23L 1/00 | (2006.01) |

(52) U.S. Cl.
CPC ... *B32B 7/14* (2013.01); *A23L 1/00* (2013.01); *B65D 75/00* (2013.01); *B65D 81/00* (2013.01); *B65D 85/00* (2013.01); *Y10T 428/24826* (2015.01)

(58) Field of Classification Search
None
See application file for complete search history.

(56) References Cited

U.S. PATENT DOCUMENTS

| | | | |
|---|---|---|---|
| 3,956,867 A * | 5/1976 | Utz et al. | 53/433 |
| 4,909,726 A | 3/1990 | Bekele | |
| 5,495,705 A | 3/1996 | Miura et al. | |
| 5,897,722 A * | 4/1999 | Bright | 156/86 |
| 6,085,903 A | 7/2000 | Jotcham et al. | |
| 6,858,106 B1 | 2/2005 | Ikenoya | |
| 7,434,692 B2 | 10/2008 | Ginsberg et al. | |
| 7,726,484 B2 | 6/2010 | Komatsu et al. | |
| 7,726,486 B2 | 6/2010 | Jones | |
| 8,603,609 B2 * | 12/2013 | Fraser et al. | 428/172 |
| 2006/0246242 A1 * | 11/2006 | Siegel et al. | 428/34.1 |
| 2007/0254120 A1 | 11/2007 | Rasmussen | |
| 2008/0274328 A1 * | 11/2008 | Gkinosatis | 428/98 |
| 2010/0199610 A1 | 8/2010 | Komatsu et al. | |
| 2012/0134606 A1 | 5/2012 | Borchardt et al. | |

FOREIGN PATENT DOCUMENTS

| | | |
|---|---|---|
| EP | 1177891 A1 | 2/2002 |
| EP | 1285744 A1 | 2/2003 |
| EP | 787656 B1 | 5/2003 |
| EP | 2070837 A1 | 6/2009 |
| WO | 2009077841 A1 | 6/2009 |

* cited by examiner

*Primary Examiner* — Mark Ruthkosky
*Assistant Examiner* — Laura C Powers
(74) *Attorney, Agent, or Firm* — Tom J. Hall (57) ABSTRACT

The present disclosure is concerned with forming and non-forming webs with improved puncture resistance suitable for use in semi-automatic horizontal form fill and seal (HFFS) packaging machines and a process for packaging hard food items with sharp angular surfaces using such webs in such machines. The webs have a double wall partially laminated structure. The structure is conveniently formed by adhesively laminating two component films in a face to face configuration using a pattern of adhesive which leaves a substantial portion of the two facing surfaces unlaminated. The lamination just needs to be sufficient that the two component films will hot form together when they are vacuum drawn into a die to form a cavity for packaging the food items. The webs comprise at least a first thermoplastic component film having substantial stored shrink forces and a second thermoplastic component film having no substantial stored shrink forces.

16 Claims, 10 Drawing Sheets

PATTERN LAMINATED DOUBLE WALL PLASTIC WEB FROM HEAT SHRINKABLE AND NON-HEAT SHRINKABLE FILMS

FIELD OF THE INVENTION

The present invention relates generally to thermoplastic food packaging materials, and more particularly to thermoplastic food packaging materials formed from pattern laminated double wall packaging webs.

BACKGROUND OF THE INVENTION

In the packaging of food products in thermoplastic film there have been attempts to address the problem of puncture of the film in various ways to assure both isolation from the atmosphere and to prevent leakage of liquids which may be present in the package. For meat products which contain bones which can be placed in a fixed relationship to the packaging, the practice has developed of applying a "patch" of polymer film on top of the primary packaging. Typically this "patch" has been adhered to the primary packaging film by a corona treatment of the facing surfaces or by covering the facing surfaces with an appropriate adhesive. Over time the size of the "patch" has evolved to cover almost the entire surface of the package thus making the location of bone less critical. However, this approach is not suitable for use with the semi-automated packaging approach wherein a cavity is thermoformed into a thermoplastic web, the food product is placed into the cavity and a portion of a second thermoplastic web is heat sealed over the open mouth of the cavity such as is taught by U.S. Pat. No. 3,956,867 to Uz et al. of Multivac. Another approach has been to simply drop "patches" into the already formed cavity before the food product is placed in the cavity in order to provide extra puncture resistance.

The approach of simply increasing the thickness of the web used to form the cavity has not met with much success. This approach is limited by the need to still be able to thermoform the web to form the cavity and the need to limit the expense of the packaging material. The need to control the expense also limits the selection of more puncture resistant materials.

SUMMARY OF THE INVENTION

The present invention involves a web with a heat sealable surface suitable for packaging food items with sharp edges which is hot formable and has increased puncture resistance. The improved puncture resistance is obtained by forming the web out of two independently manufactured thermoplastic films which have been partially laminated to each other in a manner such that a substantial portion of the two surfaces facing each other are unlaminated but also such that the partial lamination is adequate that the web can be hot formed as a single unit. In a preferred embodiment the invention involves a thermoformed cavity web comprising at least a first thermoplastic film having substantial stored shrink forces and a second thermoplastic film having no substantial stored shrink forces whereby both films have been partially adhesively laminated together.

In another preferred embodiment the invention includes a thermoformed cavity web comprising double-wall laminate formed from at least a first thermoplastic component film having substantial stored shrink forces and a second thermoplastic component film having no substantial stored shrink forces, and a non-thermoformed covering web comprising two independently manufactured thermoplastic films which have been partially laminated to each other.

In still another preferred embodiment the invention involves a thermoformed cavity web and a non-thermoformed covering web where each web comprises at least a first thermoplastic component film having substantial stored shrink forces and a second thermoplastic component film having no substantial stored shrink forces whereby both films have been partially adhesively laminated together.

In another preferred embodiment less than about 50% of the facing surfaces of each component film are laminated, more preferably less than about 25%. It is preferred that the partially laminated cavity web be capable of being formed into cavities of substantial depth by being vacuum drawn into a mold with it being especially preferred that the double-wall web be capable of draws of about 2 inches or greater.

In one embodiment of the invention, the two edges of the two partially laminated component films which run in the machine direction are continuously laminated to provide a web with sealed side edges. It is especially preferred that the lamination sites between the two films form a regular repeating pattern. It is particularly preferred that the pattern be either a honeycomb with the spaced apart hexagons or circles as the unlaminated areas or spaced apart hexagons, dots or circles of lamination. It is particularly convenient if the lamination is affected with the use of an adhesive. A particularly preferred class of adhesive is the two part polyurethane adhesive, particularly those available with solids content greater than about 30 wt %.

In a preferred embodiment the cavity and covering webs include at least one of component films of the partially laminated web having an oxygen barrier. It is particularly convenient if both component films contain an oxygen barrier, thus providing protection for the packaged food item even if one of the component films is punctured. An especially convenient construction is one where the cavity web uses a first thermoplastic heat shrinkable film having substantial stored shrink forces which exhibits a heat shrinkage in both machine and transverse directions of at least 5%, preferably, at least 10%, at least 20%, at least 30% or between 30% and 40%; and a second thermoplastic non-heat shrinkable film. Preferably, the second thermoplastic non-heat shrinkable component film exhibits a heat shrinkable in both machine and transverse directions of less than 30%, less than 20%, less than 10%, or less than 5%. It is also particularly helpful if the surfaces of the two component films which face each other are heat sealable to each other. The component films typically each have a thickness between about 2 and 24 mils, preferably between 4 and 20 mils and more preferably between 2 and 10 mils.

It is advantageous if the first thermoplastic heat shrinkable component film is biaxially oriented which has been stretched along its lengths and across its width after formation so as to not relieve the stresses induced by this stretching operation. If this film is destined to be used in a hot forming operation it may be partially annealed without full relief of these stresses. Nonetheless the first thermoplastic heat shrinkable component film is characterized as having substantial stored shrink forces because if it is heated to an appropriate temperature it will display substantial shrinking. Indeed, one of the motivations of biaxially orienting such films is to give them the capacity to heat shrink. In contrast to the first thermoplastic heat shrinkable component film, the second thermoplastic non-heat shrinkable component film is characterized as having little or no substantial stored shrink forces. Both components film may be formed by blown film coextrusion process and the heat shrinkable component film being formed by a double-bubble blown film coextrusion process.

The present invention also involves a process for packaging hard food items with sharp angular surfaces by hot forming open mouth cavities using the double wall partially laminated web described hereinabove, placing the food items into the cavity, covering the cavity with a web of thermoplastic film, evacuating the interior of the cavity, heat sealing the covering thermoplastic film to the cavity and separating the sealed package from the remainders of the webs. In a preferred embodiment, the step of forming the cavity involves deep drawing the double wall partially laminated web into a mold using a vacuum. In a particularly preferred embodiment the draw into the mold is about two inches or greater. In an advantageous embodiment, the hard food items are bones or meat products containing bones, especially exposed bones. In a preferred embodiment both the cavity and covering webs include a double wall partially laminated web of two independently manufactured thermoplastic webs.

DETAILED DESCRIPTION OF THE INVENTION

The present invention involves hot formable cavity webs and non-formable covering webs where each has improved puncture resistance obtained in an economical manner by a particular structure involving the partial lamination of two independently formed thermoplastic films. This structure is capable of being used in the well-known packaging procedures of hot forming a cavity from a flat web by vacuum drawing it into a die, placing the items to be packaged into the cavity, either evacuating the cavity or gas flushing the cavity with an inert gas, then sealing the open mouth of the cavity with a covering web by heat sealing it to the web from which the cavity was formed. The structure of the formable and non-formable webs involves a pattern of lamination which leaves substantial areas of the internal surfaces of both films which face each other unlaminated. It is believed that there is a balance between complete lamination between the entire areas of the two facing surfaces, which offers less puncture resistance and such minimal lamination that the two film components are not able to properly form into a hot drawn cavity in this well know packaging procedure. This partial lamination approach provides puncture resistance formerly only available from much more expensive thermoplastic films.

The component films used to form the partially laminated double wall webs can be any thermoplastic film known for use in the flexible packaging industry. The component films used for a cavity web should be hot formable in the vacuum forming operation and may be adhesively laminatable to each other. In addition, at least one of the component films should have a surface opposite its lamination surface (i.e. the surface which faces the other component film) which is heat sealable under typical industry conditions. If the items to be packaged are subjected to accelerated degradation on exposure to atmospheric oxygen, such as various food items including animal derived products, it is desirable to include an oxygen barrier in the film structure of one of the component films used for both the cavity and covering webs. It is particularly desirable to include an oxygen barrier in the structure of both component films for both the cavity and covering webs so that a partial puncture through just one of the oxygen barriers will not compromise the oxygen barrier integrity of the resultant packaging. It is also convenient to use the same component films having identical film structures for both the cavity and covering webs.

Component film structures with a core layer of ethylene vinyl alcohol (EVOH) and an exterior layer of a fairly low softening point polyolefin or with a low melting point component are particularly useful for making the partially laminated double wall webs. One approach to this exterior layer is a blend of a linear low density polyethylene (LLDPE) with a low density polyethylene (LDPE) and suitable additive for slip and blocking. Films with an EVOH core sandwiched between two polyamide layers are the basis for a number of films suitable for the partially laminated double wall webs. The polyamide layers have been found useful in stabilizing the EVOH layer during thermal processing, have good adhesion to the EVOH and impart good mechanical strength to the film structure. A convenient way to marry this core to heat sealable exterior layers is through the use of polyethylene exterior layers joined to the polyamide (or nylon) layers via tie layers well known in the industry for promoting extrusion adhesion between polyethylene layers and polyamide layers. Among these are polyethylene copolymers which have been modified to carry anhydride functionality. Seven layer films based upon this approach have found favor in the flexible packaging industry and are particularly well suited as component films for the partially laminated double wall webs. These component films are conveniently made by the well known melt extrusion technique in which multiple extruders feed a single extrusion die, with each extruder being responsible for the production of a particular layer.

The adhesive used to join the component films can be any of those commonly used in the flexible packaging industry. It is convenient if the adhesive has sufficient viscosity to retain the pattern in which it is applied. The particular properties of the adhesive will to some extent depend on the manner in which it is applied such as whether it is applied as a solid or out of a solution. Particularly convenient are the two part polyurethane adhesives, particularly those available with solids content greater than about 30 wt %.

The partially laminated webs with which the present invention is concerned are particularly suitable for use in the packaging process described in U.S. Pat. No. 3,956,867, incorporated by reference herein. In this procedure a flat web of a thermoplastic film is drawn over the mouth of one or more dies generally of the shape of the cavity desired for packaging goods, commonly food items, and heated to a forming temperature, typically by being drawn against a heated platen. This film is then drawn into the die or dies by pulling a vacuum from the bottom of the die. The open mouth of each die is typically surrounded by a gasket which forms a seal with the portion of this film which is laid over the gasket to maintain a vacuum as the film is drawn into the die. The cavities which are formed are then moved forward a set amount to allow the formation of cavities in another portion of the web and to allow the just formed cavities to be filled with the items to be packaged. The now filled cavities are covered with another thermoplastic film and advanced into an evacuation chamber. In this chamber the air is drawn out of the cavity and then the appropriate portions of the covering film is heat sealed across the mouths of the cavities to create sealed evacuated packages. Air is then bled back into the evacuation chamber and the sealed packages are separated from the balance of the webs from which the cavities and top covers were formed by appropriately operating shears or other cutting devices. In packaging items with sharp or hard edges such as bones or meat with protruding bones, it is advantageous to first bleed air into the top of evacuation chamber such that the contents of the package are not forced into the top cover by air entering the bottom of the chamber. In the usual machine arrangement this top cover is adjacent a plate so there is a potential for hard packaged items to press this film into this plate and cause a puncture if an air cushion is not provided by advanced venting into the top of the evacuation chamber.

This procedure allows the use of less expensive cover films that have less inherent puncture resistance.

The lamination pattern of the double walled films with which the present invention is involved should ensure that the two component films do not exhibit any noticeable separation from each other when formed into a cavity in the manner discussed hereinabove. In this regard, it has been observed that if two thermoplastic webs are simply laid one atop the other, heated to a forming temperature and then vacuum drawn in a mold they will separate with the top film not being drawn as deeply into the mold as the bottom film which faces the source of the vacuum. This may be a reflection of the ability of air at ambient pressure to penetrate between the two films. Thus it may be advantageous to use a lamination pattern which prevents or substantially inhibits this penetration.

The advantages of the present invention can best be realized by using thermoplastic films commonly employed with the semi-automatic hot form machines to form the double walled partially laminated structure. Among these the blown films, particularly those of thinner gauges are particularly preferred. The desired puncture resistance might also be obtainable by increases in web gauge but this poses problems of not only cost but also formability. As the gauge or thickness increases, the ability to form into cavities decreases to the point where plug assist molding becomes required and ultimately to the point that deeper molds are very difficult to fill. The present invention therefore provides the ability to obtain the desired puncture resistance with an inexpensive readily formable web.

The double walled partially adhesively laminated films with which the present invention is concerned are particularly attractive for the packaging of less expensive meat products. Among these are the products known in the meat industry as offal. Many of these products have high bone content or, in some cases, are essentially bones. This creates a greater risk of puncture of the packaging film by the packaged product.

Figure 1A:
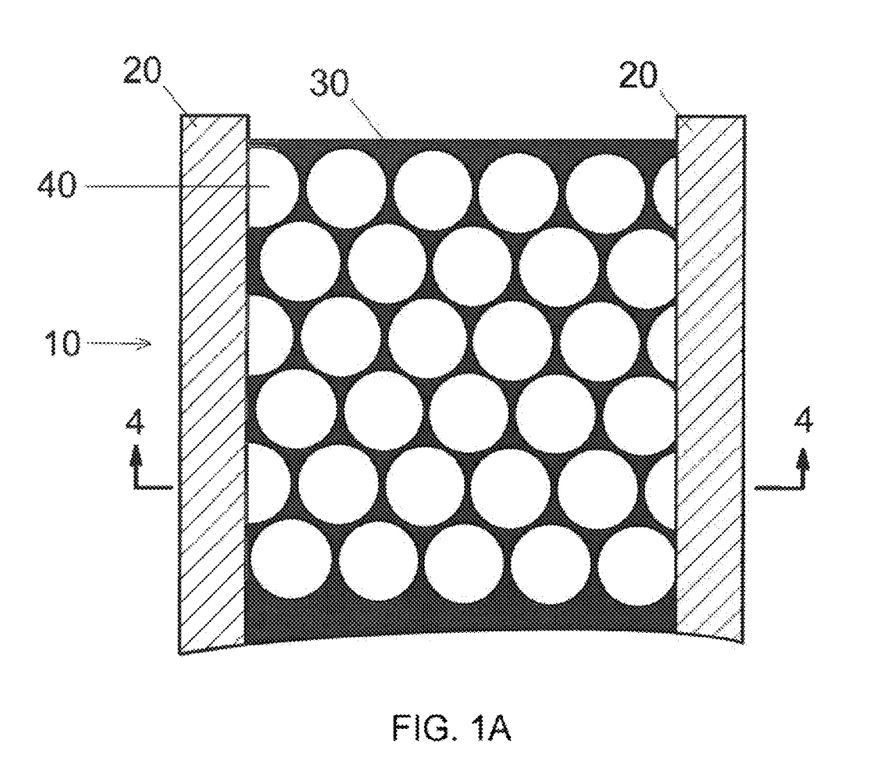
FIG. 1A is a top plan view of the partially laminated film 10 showing the two strips of adhesive 20 adhering the edges of a top film to the edges of a bottom film. Also shown is a honeycomb pattern of adhesive 30 with the resultant circular voids 40.
Figure 1B:
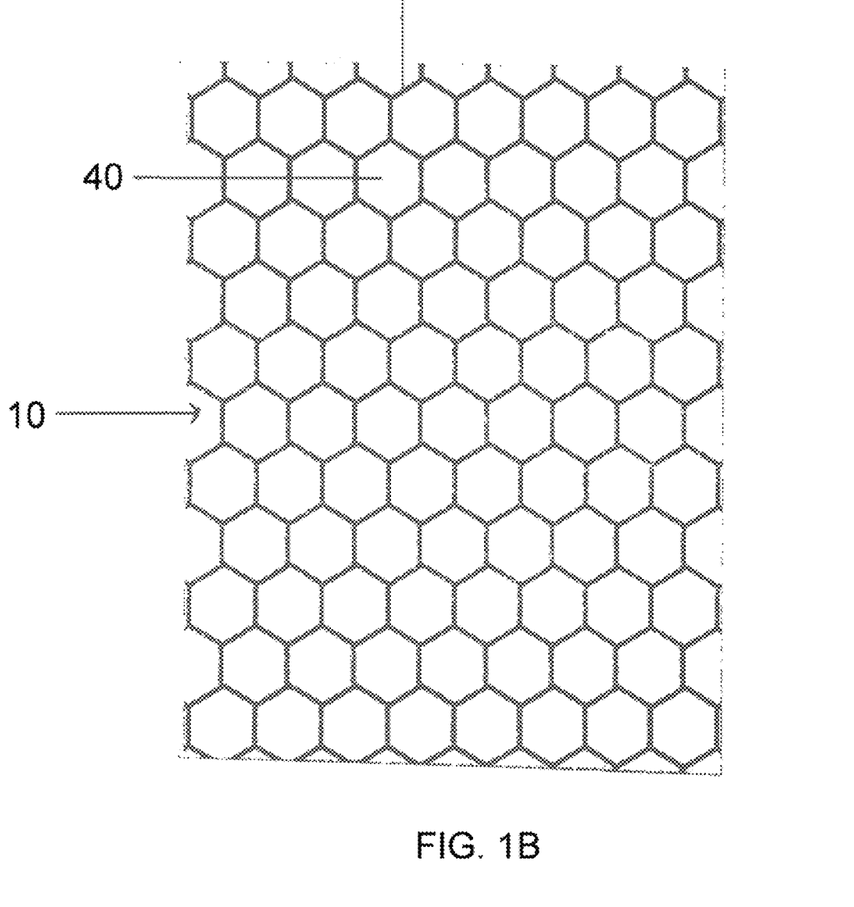
FIGS. 1B and 1C are each a top plan view of the partially laminated film 10 showing a honeycomb pattern of adhesive 30 with the resultant hexagonal voids 40.
Figure 1C:
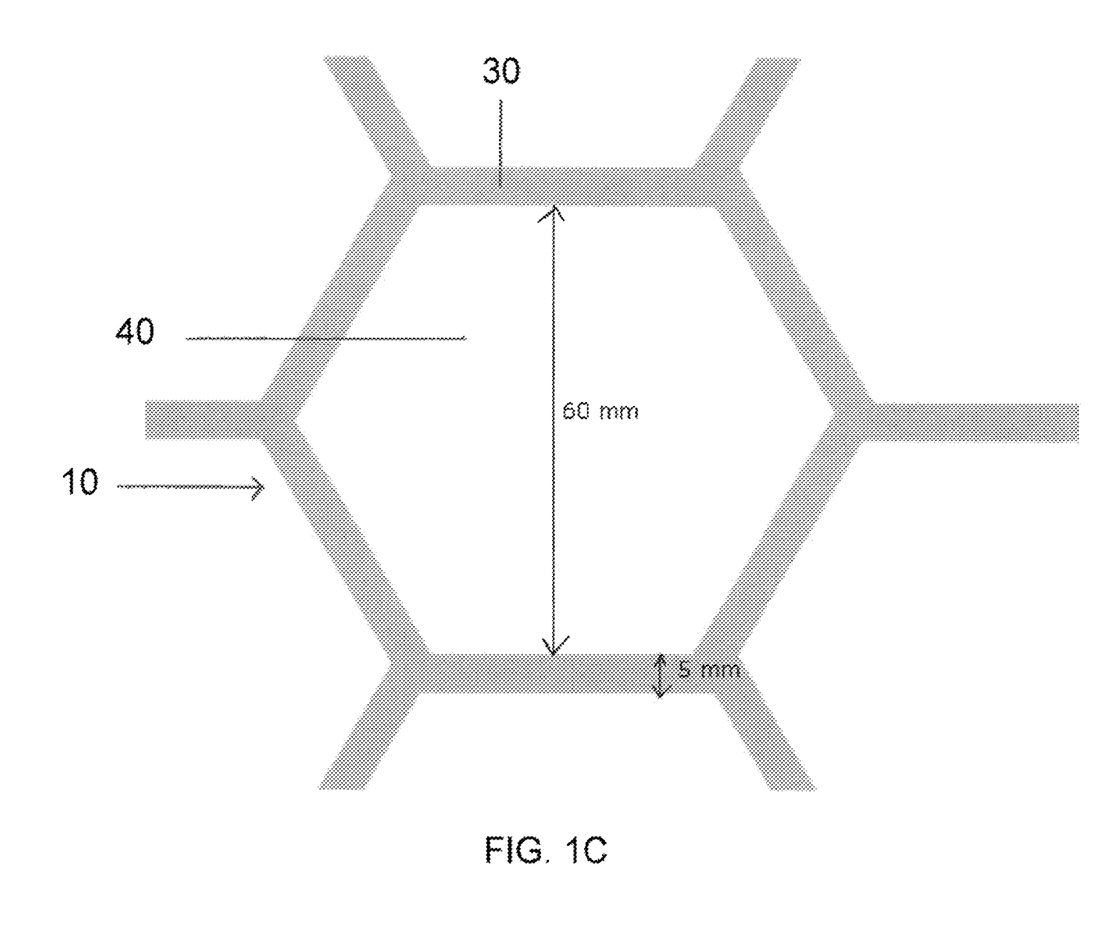
Figure 2:
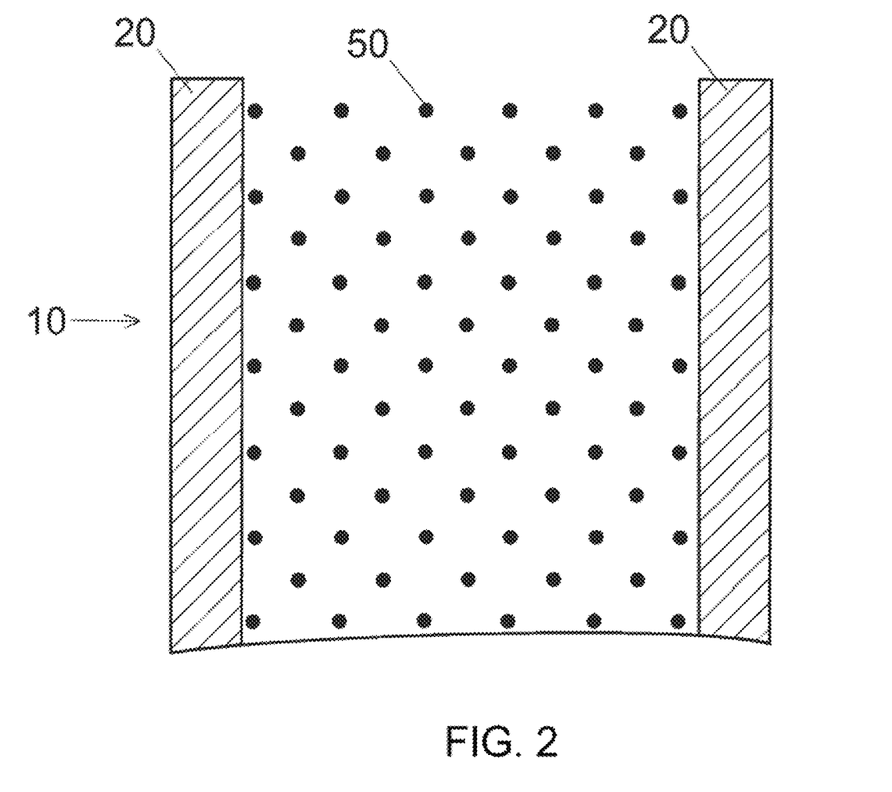
FIG. 2 is a top plan view of an alternative embodiment of the partially laminated film 10 showing the two strips of adhesive 20 adhering the edges of a top film to the edges of a bottom film and also showing the dot pattern of adhesive 50.
Figure 3:
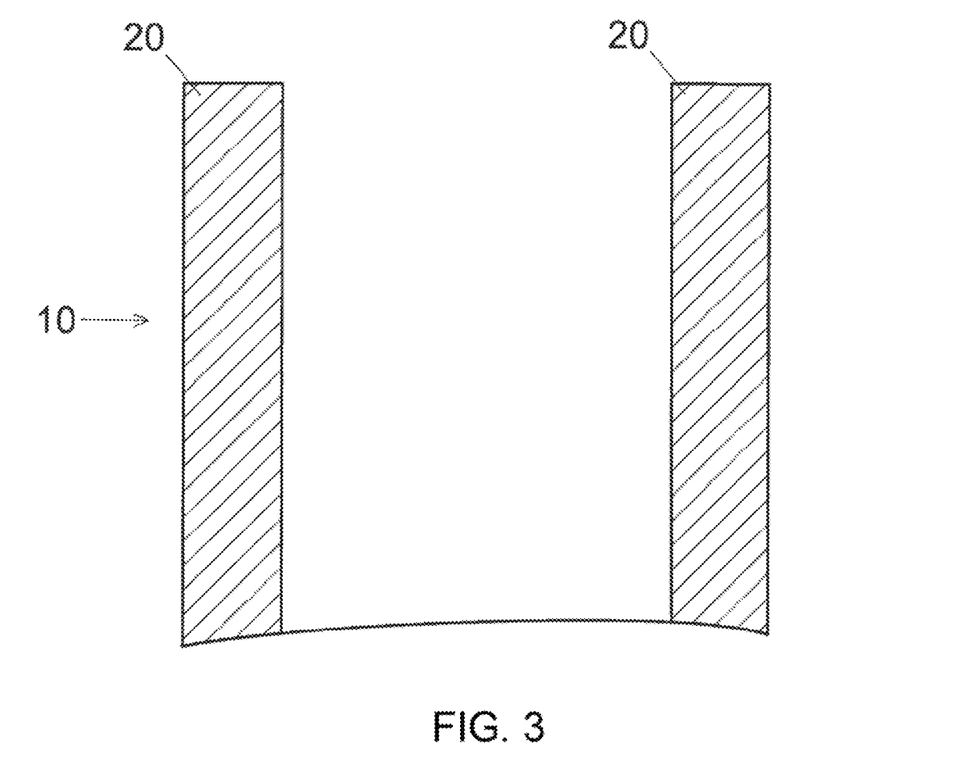
FIG. 3 is a top plan view of another alternative embodiment of the partially laminated film 10 showing the two strips of adhesive 20 adhering the edges of a top film to the edges of a bottom film. In this embodiment the only adhesive connection between the top film and the bottom film are the edge strips 20.
Figure 4:
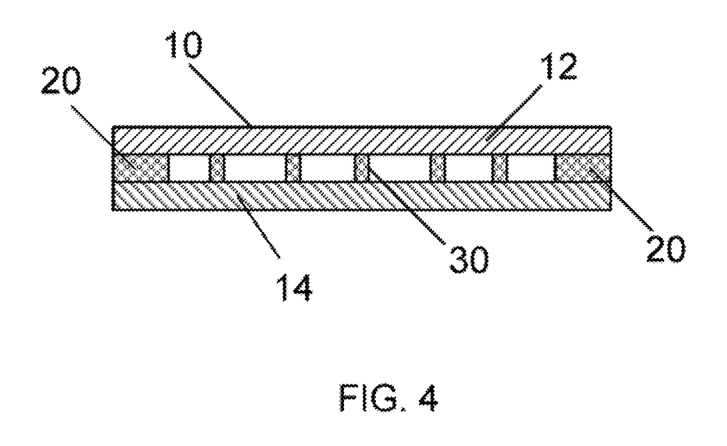
FIG. 4 is a cross section of the partially laminated film 10 along line 4-4 of FIG. 1. It shows the top film 12 joined to the bottom film 14 by the side strips of adhesive 20 and the honey comb pattern of adhesive 30.

The construction of suitable partially laminated double walled films is illustrated in FIGS. 1-4. In FIGS. 1A, 1B and 1C two thermoplastic component films have been laminated in a face to face configuration to yield the double wall partially laminated film 10. In FIG. 1A, the lamination is effected using two side strips of adhesive 20 and a honeycomb patter of adhesive 30 between the centers of the two facing surfaces. This leaves circular voids 40 between the two facing surfaces. In FIGS. 1B and 1C, the lamination is achieved by applying an adhesive 30 in a honeycomb pattern which leaves hexagon voids 40 between the two facing surfaces. As illustrated in FIGS. 1B and 1C, hexagonal adhesive voids 40 are created by pattern applying adhesive 30 in a hexagonal shape having an application width of approximately 5 mm spaced apart by a distance of 60 mm. The resulting cross-section along line 4-4 in FIG. 1A is shown in FIG. 4. The component films 12 and 14 are adhered together by both the side strips of adhesive 20 but also the honeycomb pattern of adhesive 30. FIG. 2 illustrates an alternative approach in which the adhesive pattern between the facing surfaces of the component films is a patter of circular dots of adhesive 50, along with the side strips of adhesive 20. FIG. 3 illustrates a third alternative in which the two component films are simply adhered together with the side strips of adhesive 20.

The hot forming dies of the semi-automatic packaging machines with which the double wall partially laminated thermoplastic webs with which the present invention is concerned find particular utility are illustrated in FIGS. 5-6. FIG. 5A illustrates a set of four deep draw dies 60 which are to be covered by a single portion of the double wall web. After that portion is drawn into the dies to form four cavities, the dies are moved down, out of the way, and the web is indexed forward in the machine direction 61 so that an unformed portion of the web now covers the dies. FIG. 5B and FIG. 5D illustrate the profile of an individual die 62. The web is drawn to the bottom of the die 66 and in being so formed it is caused to conform to the radiused corners along the width of the cavity 64 and along the length of the cavity 68. FIG. 5C illustrates the open mouth 63 and perimeter flange 65 of the die 62. Later in the process a portion of another thermoplastic web (which may or may not be double walled) will be brought into position to cover the open mouth 63 and will be heat sealed to the perimeter flange 65 to create a sealed package.

Figure 5A:
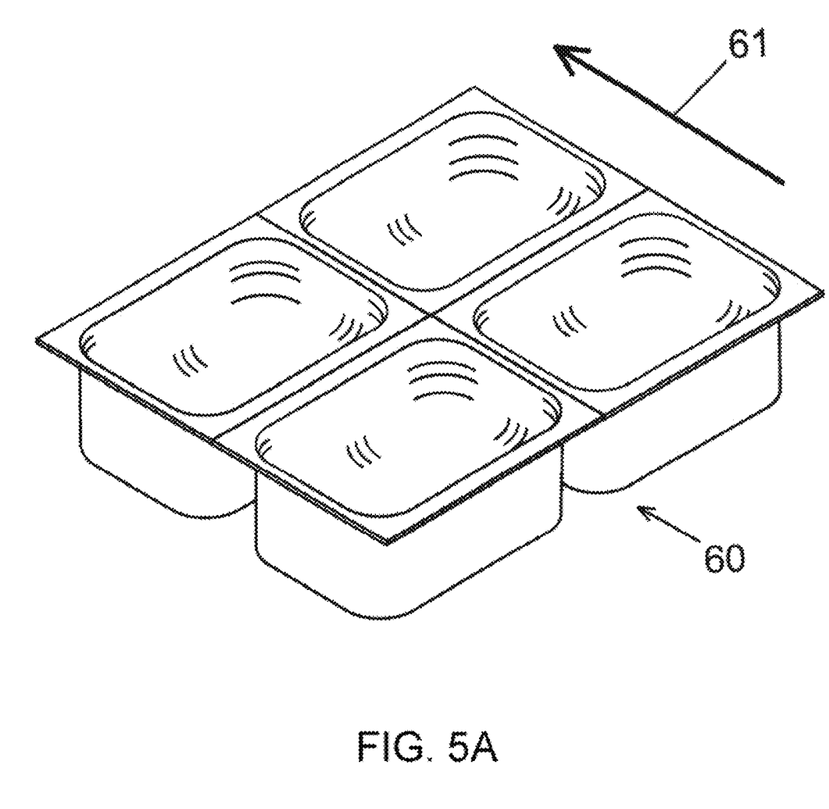
FIG. 5A is a perspective view of a four die set up 60 for the formation of cavities by deep hot vacuum draw.
Figure 5B:
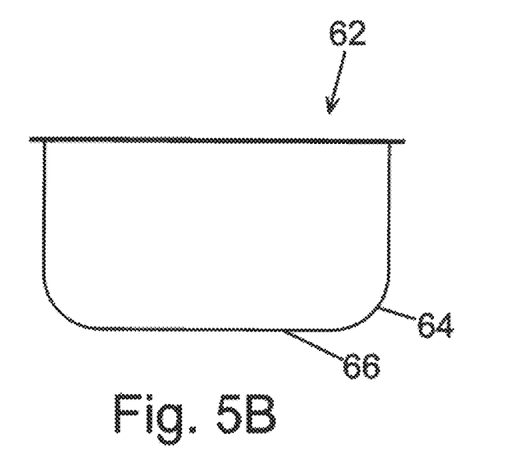
FIG. 5B is a side elevation of a single deep draw die 62 showing its radiused corner 64 along its short dimension and its bottom 66.
Figure 5C:
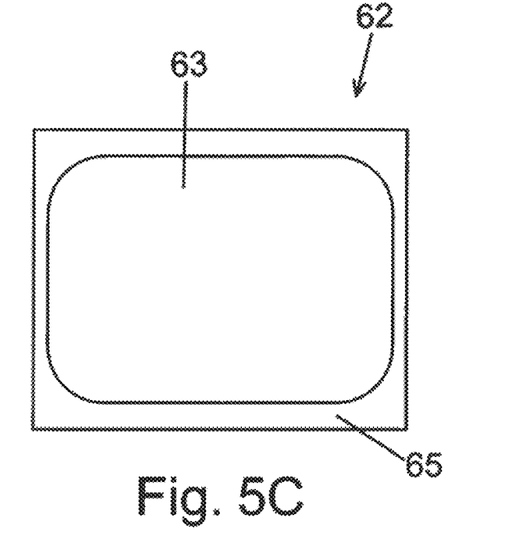
FIG. 5C is a plan view of a single deep draw die 62 showing its open mouth 63 and its perimeter flange 65.
Figure 5D:
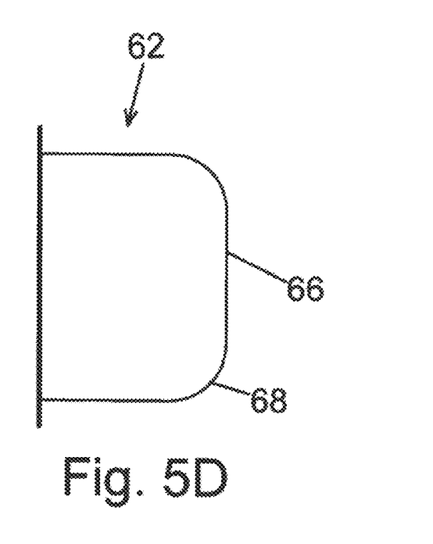
FIG. 5D is an end elevation of a single deep draw die 62 showing its radiused corner 68 along its long dimension and its bottom 66.

In some cases the deep draw of mold 64, typically in the range of 3 inches, may result in too great a thinning of the double wall web to give the puncture resistance desired with some items to be packaged. The depth of the draw is provided by the thermoplastic stretching of the web drawn into the die and, of course, as it is stretched it thins.

FIGS. 6 A-D illustrate an approach that involves a shallower hot draw for use with items that are more difficult to package with these semi-automatic packaging machines.

Figure 6A:
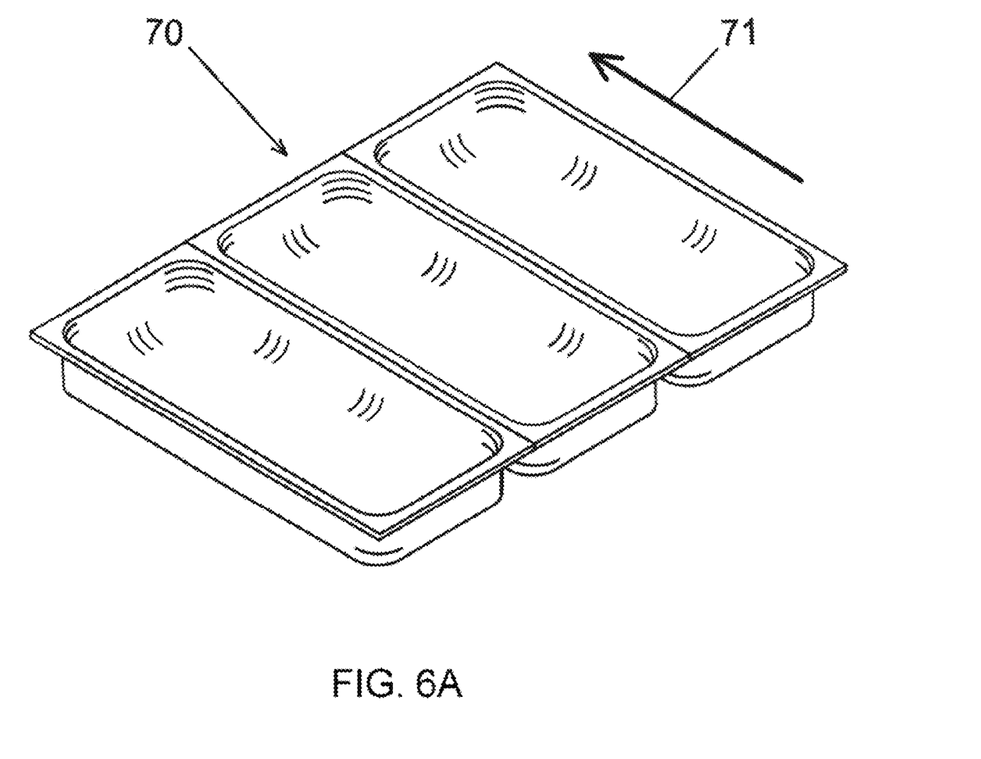
FIG. 6A is a perspective view of a three die set up 70 for the formation of cavities by shallow hot vacuum draw.
Figure 6B:
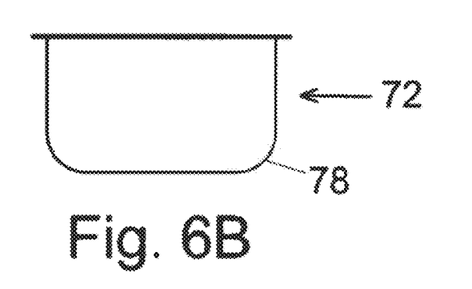
FIG. 6B is a side elevation of a single shallow draw die 72 showing its radiused corner 78 along its long dimension.
Figure 6C:
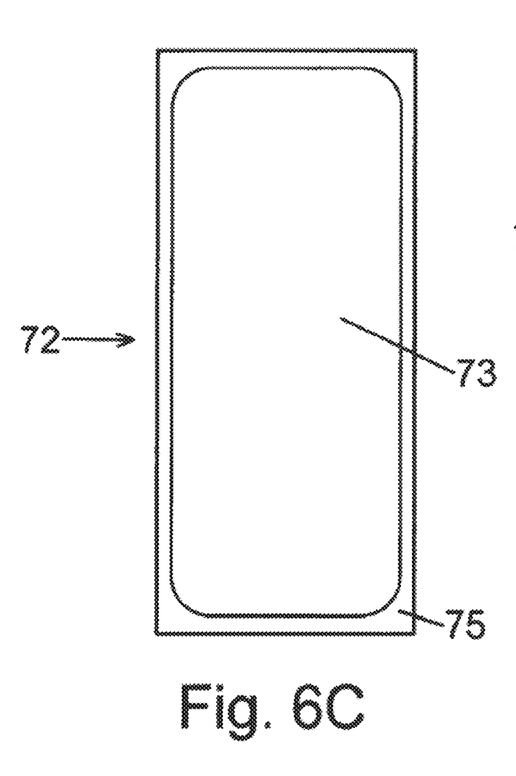
FIG. 6C is a plan view of a single shallow draw die 72 showing its open mouth 73 and its perimeter flange 75.
Figure 6D:
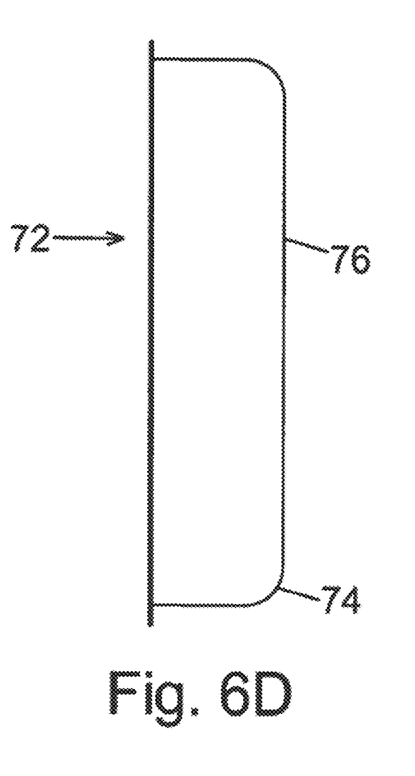
FIG. 6D is an end elevation of a single shallow draw die 72 showing its radiused corner 74 along its short dimension and its bottom 76.

FIG. 6A illustrates a set of three shallow draw dies 70 which are to be covered by a single portion of the double wall web. After that portion is drawn into the dies to form four cavities, the dies are moved down, out of the way, and the web is indexed forward in the machine direction 71 so that an unformed portion of the web now covers the dies. FIG. 6B and FIG. 6D illustrate the profile of an individual die 72. The web is drawn to the bottom of the die 76 and in being so formed it is caused to conform to the radiused corners along the width of the cavity 74 and along the length of the cavity 78. FIG. 6C illustrates the open mouth 73 and perimeter flange 75 of the die 72. Later in the process a portion of another thermoplastic web (which may or may not be double walled) will be brought into position to cover the open mouth 73 and will be heat sealed to the perimeter ledge 75 to create a sealed package. The shallower draw, typically in the range of about 1½ inches, results in less thinning of the double wall web thus preserving greater puncture resistance. This results in packaging better suited for some difficult to package items such as marrow bones.

WORKING EXAMPLES

Example 1

Beef marrow bones were packaged using a Multivac packaging machine which thermally formed an open mouth cavity in a thermoplastic web into which the bones were placed, followed by covering the open mouth with another thermoplastic web, evacuating the air in the cavity, heat sealing a portion of the covering web to the mouth of the cavity to create a sealed package and separating the sealed package from the remainder of the two webs. The cavity forming web was formed from a first independently manufactured thermoplastic film having substantial stored shrink forces partially laminated to a second independently manufactured thermoplastic film having no substantial stored shrink forces. It should be noted that the cavity of the packages are formed such that the first independently manufactured thermoplastic film having substantial stored shrink forces is an external surface of the package and the second independently manufactured thermoplastic film having no substantial stored shrink forces is a food contact surface. The covering web was formed from a first independently manufactured thermoplastic film having no substantial stored shrink forces adhesively partially laminated to a second independently manufactured thermoplastic film having no substantial stored shrink forces. The finished and isolated packages were evaluated for leakage of contained fluid immediately after formation, after a twenty four hour period and after a hundred sixty eight hour period. It is also contemplated that the covering web may include a first independently manufactured thermoplastic film having substantial stored shrink forces partially laminated to a second independently manufactured thermoplastic film having no substantial stored shrink forces.

A cavity forming web was a partially laminated film in accordance with the present invention. The laminated film was about 13 mils thick and was the result of partially adhesively laminating a 6 mil 7 layer biaxially oriented blown heat shrinkable first component film to a 7 mil 7 layer blown non-heat shrinkable second component film with both films containing an ethylene vinyl alcohol (EVOH) oxygen barrier. The biaxially oriented blown heat shrinkable first component film was obtained from double bubble processing with a draw ratio of 2.

The partially laminated film was made by using a honeycomb pattern of a two component polyurethane adhesive in which the hexagonal adhesive free voids were 60 mm across opposite facing and were spaced 5 mm apart giving an adhesive surface area of approximately 15.2% of the total surface area. The film structure for the 6 mil heat shrinkable first component film was multilayered with the general composition and weight percentage of each layer relative to the total weight of the film being as follows: 14.2% sealant layer of a mixture of ultra-low density polyethylene (ULDPE) and linear low density polyethylene (LLDPE) with 52.00 wt % of ULDPE, 43.50 wt % LLDPE and the balance additives/22.2% of tie layer for nylon adhesion (50 wt % anhydride modified LLDPE, 30 wt % plastomer (ethylene alpha-olefin copolymer), 16 wt % ultra-low density polyethylene (ULDPE) and 4 wt % additive mixture)/7.2% of a nylon blend (45 wt % Nylon 6/69, 35 wt % Nylon 6 and 20 wt % Nylon 6I/6T)/8.6% ethylene vinyl alcohol (EVOH)/7.2% of a nylon blend (45 wt % Nylon 6/69, 35 wt % Nylon 6 and 20 wt % Nylon 6I/6T)/32.2% of tie layer for nylon adhesion (40 wt % plastomer, 26 wt % ultra-low density polyethylene (ULDPE), 30 wt % anhydride modified (LLDPE) and 4 wt % additive mixture)/8.4% exterior layer of a nylon blend (45 wt % Nylon 6/69, 30 wt % Nylon 6, 17 wt % Nylon 6I/6T, balance additives). The first component film exhibited heat shrinkage between 30% and 35% in the transverse direction at 90° C. and between 35% and 40% in the machine direction at 90° C.

The film structure for the 7 mil non-heat shrinkable second component film was multilayered with the general composition and weight percentage of each layer relative to the total weight of the film being as follows: 14% of an exterior layer of a mixture of low density polyethylene (LDPE) and LLDPE (84.20 wt % LLDPE, 10 wt % LDPE, balance additives)/18% of tie layer for nylon adhesion (84 wt % ULDPE and 16 wt % anhydride modified LLDPE)/12% a nylon blend (85 wt % Nylon 6 and 15 wt % Nylon 6I/6T)/12% EVOH/12% a nylon blend (85 wt % Nylon 6 and 15 wt % Nylon 6I/6T)/18% of tie layer for nylon adhesion (84 wt % ULDPE and 16 wt % anhydride modified LLDPE)/14% of an exterior layer of mixture of LDPE and LLDPE (82.3 wt % LLDPE, 15 wt % LDPE, balance additives).

One of the exterior layers of the non-heat shrinkable second component film was corona treated to a surface energy between 44 and 50 dynes/cm$^2$ and subsequently adhesively laminated to the exterior nylon blend layer of the heat shrinkable first component film using the honeycomb pattern with a two-part polyurethane adhesive. The adhesive was applied to give 1.3 parts by weight of adhesive solids per 190.5 parts by weight of partially laminated web.

The non-forming covering web was a partially laminated film. The laminated film was about 13 mils thick and was the result of partially adhesively laminating a 6 mil 7 layer blown non-heat shrinkable first component film to a 7 mil 7 layer blown non-heat shrinkable second component film with both films containing an ethylene vinyl alcohol (EVOH) oxygen barrier. The covering web was a partially laminated film made by using a honeycomb pattern of a two component polyurethane adhesive in which the hexagonal adhesive free voids were 60 mm across opposite facing and were spaced 5 mm apart giving an adhesive surface area of approximately 15.2% of the total surface area. The non-heat shrinkable first component film was 6 mil thick and multilayered structure with the general composition and weight percentage of each layer relative to the total weight of the film being as follows: 18.8% sealant layer of a mixture of ultra-low density polyethylene (ULDPE) and linear low density polyethylene (LLDPE) with 87.7 wt % of ULDPE, 10 wt % LLDPE and the balance additives/14.6% of tie layer for nylon adhesion (90 wt % ULDPE and 10 wt % anhydride modified LLDPE)/14.7% of a nylon blend (85 wt % Nylon 6 and 15 wt % Nylon 6I/6T)/8% ethylene vinyl alcohol (EVOH)/14.7% of a nylon blend (85 wt % Nylon 6 and 15 wt % Nylon 6I/6T)/14.6% of tie layer for nylon adhesion (90 wt % ULDPE and 10 wt % anhydride modified LLDPE)/14.7% a nylon blend (77 wt % Nylon 6, 15 wt % Nylon 6I/6T, balance additives).

The non-heat shrinkable second component film was 7 mil thick and multilayered structure with the general composition and weight percentage of each layer relative to the total weight of the film being as follows: 14% of an exterior layer of a mixture of low density polyethylene (LDPE) and LLDPE (65.7 wt % LLDPE, 30 wt % LDPE, balance additives)/18% of tie layer for nylon adhesion (84 wt % ULDPE and 16 wt % anhydride modified LLDPE)/12% a nylon blend (85 wt % Nylon 6 and 15 wt % Nylon 6I/6T)/12% EVOH/12% a nylon blend (85 wt % Nylon 6 and 15 wt % Nylon 6I/6T)/18% of tie layer for nylon adhesion (84 wt % ULDPE and 16 wt % anhydride modified LLDPE)/14% of an exterior layer of a mixture of LDPE and LLDPE (84.2 wt % LLDPE, 10 wt % LDPE, balance additives).

The ULDPE+LLDPE sealant layer of the 6 mil first component film and one of the exterior layers of the 7 mil second component film were both corona treated to a surface energy between 44 and 50 dynes/cm$^2$ and subsequently adhesively laminated together using the honeycomb pattern with a two part polyurethane. The adhesive was applied to give 1.2 parts by weight of adhesive solids per 200 parts by weight of partially laminated web.

Comparative Example 1

A first comparative cavity forming web and first comparative non-forming covering web were each prepared from an identical 13 mil partially laminated web. The first comparative laminate was the result of partially adhesively laminating a 6 mil 7 layer blown non-heat shrinkable first component film to a 7 mil 7 layer blown non-heat shrinkable second component film with both films containing an ethylene vinyl alcohol (EVOH) oxygen barrier. Both of the cavity forming web and the non-forming covering web were formed from the identical 13 mil partially laminated web made by using a honeycomb pattern of a two component polyurethane adhesive in which the hexagonal adhesive free voids were 60 mm across opposite facing and were spaced 5 mm apart giving an adhesive surface area of approximately 15.2% of the total surface area. The first and second component films of each of the cavity forming web and non-forming covering web had a film structure identical to the non-forming covering web described above in Example 1.

Comparative Example 2

A second comparative cavity forming web was prepared from a 12 mil partially laminated web. The second comparative laminate was the result of partially adhesively laminating a 6 mil 13 layer blown non-heat shrinkable first component film to a 6 mil 9 layer blown non-heat shrinkable second component film with both films containing an ethylene vinyl alcohol (EVOH) oxygen barrier.

The 6 mil 13 layer blown non-heat shrinkable first component film of the cavity forming web was formed from a collapsed bubble 7 layered film having a general composition and weight percentage of each layer relative to the total weight of the film being as follows: 23.2% of an exterior layer of a mixture of 82.4 wt % LLDPE, 10 wt % ULDPE, and the balance additives/18.3% of tie layer for nylon adhesion (a mixture of 83 wt % of mLLDPE (metallocene linear low density polyethylene) and 17 wt % of an anhydride modified polyethylene copolymer)/9.9% a nylon blend (a mixture of 80 wt % Nylon 6 and 20 wt % Nylon 6I/6T)/8.1% EVOH/9.9% a nylon blend (a mixture of 80 wt % Nylon 6 and 20 wt % Nylon 6I/6T)/15.3% of tie layer for nylon adhesion (a mixture of 83 wt % mLLDPE and 17 wt % of anhydride modified LLDPE)/15.3% ethylene vinyl acetate (EVA) with a vinyl acetate (VA) proportion of about 12%.

The 6 mil 9 layer blown non-heat shrinkable second component film of the cavity forming web was a multilayered structure with the general composition and weight percentage of each layer relative to the total weight of the film being as follows: 5% sealant layer of a mixture of ultra-low density polyethylene (ULDPE) and linear low density polyethylene (LLDPE) with 87.7 wt % of ULDPE, 10 wt % LLDPE and the balance additives/9.3% of ultra-low density polyethylene (ULDPE) and linear low density polyethylene (LLDPE) with (87.7 wt % ULDPE, 10 wt % LLDPE and the balance additives/12% of a mixture of ULDPE and polyethylene (PE) reclaim (75 wt % ULDPE and 25 wt % PE/7% of tie layer for nylon adhesion (90 wt % ULDPE and 10 wt % anhydride modified LLDPE)/14.7% of a nylon blend (85 wt % Nylon 6 and 15 wt % Nylon 6I/6T)/8% ethylene vinyl alcohol (EVOH)/14.7% of a nylon blend (85 wt % Nylon 6 and 15 wt % Nylon 6I/6T)/14.6% of tie layer for nylon adhesion (90 wt % ULDPE and 10 wt % anhydride modified LLDPE)/14.7% a nylon blend (77 wt % Nylon 6, 15 wt % Nylon 6I/6T, balance additives).

In each film structure the additives indicated were a mixture of an antiblock additive, a slip additive and in some cases a processing aid.

The ULDPE+LLDPE sealant layer of the 6 mil 9 layer second component film and one of the exterior layers of the 6 mil 13 layer first component film were both corona treated to a surface energy between 44 and 50 dynes/cm$^2$ and subsequently adhesively laminated together using the honeycomb pattern with a two part polyurethane adhesive. The adhesive was applied to give 1.3 parts by weight of adhesive solids per 181.9 parts by weight of partially laminated web.

Roll stock of each of Example 1 and Comparative Example 1 webs was fed to a Multivac packaging machine and formed into approximately three inch deep cavities. Each cavity was filled with beef marrow bones, covered by a covering web, evacuated and heat sealed to a portion of the covering web to create a sealed package. The sealed packages were then separated from the remaining portions of the cavity forming web and the covering web.

The sealed packages were then evaluated for integrity of the package cavity immediately after separation, 1 hour, 24 hours, and 168 hours after separation. The evaluation criterion was the visual observation that the package walls no longer tightly adhered to the package contents indicating a loss of vacuum. The results were as follows:

TABLE 1

Puncture Failures

|  | Immediate Evaluation (Sample Size) | After 1 Hour Evaluation (Sample Size) | After 24 Hour Evaluation (Sample Size) | After 168 Hour Evaluation (Sample Size) |
|---|---|---|---|---|
| EXAMPLE 1 | 5% (905) | 2.8% (624) | 3.3% (60) | — |
| COMPARATIVE EXAMPLE 1 | 18% | — | — | 8.8% (79) |

It is expected that using a single wall film of an equivalent gauge would have resulted in a significant number of leakers where none were observed for the partially laminated double wall film.

Roll stock of each of Example 1 and Comparative Example 2 webs were evaluated for puncture resistance as measured by their slow rate penetration resistance. Slow rate penetration resistance refers to the test which permits flexible thermoplastic webs to be characterized for slow rate penetration resistance to a driven probe. The test probe may be of different diameters. The test is performed at room temperature, by applying a biaxial stress at a single test velocity on the material until perforation occurs. The slow rate penetration resistance of webs of Example 1 and Comparative Example 1 results were as follows:

TABLE 2

Puncture Resistance
(1 mm Probe)

| | Puncture (N) | Puncture (lbf) | Displacement at Maximum Load (in) |
|---|---|---|---|
| EXAMPLE 1 | 24.3 | 5.46 | 0.22 |
| COMPARATIVE EXAMPLE 2 | 15.3 | 3.44 | 0.17 |

TABLE 3

Puncture Resistance
(6 mm Probe)

| | Puncture (N) | Puncture (lbf) | Displacement at Maximum Load (in) |
|---|---|---|---|
| EXAMPLE 1 | 151.5 | 34.06 | 0.59 |
| COMPARATIVE EXAMPLE 2 | 107.8 | 24.23 | 0.56 |

A person having ordinary skill in the art would recognize that the slow rate penetration resistance is a measure of a film's toughness and puncture resistance. A packaging web with a high slow rate penetration resistance value, relative to an incumbent film, is tougher and more puncture resistant and thus, would be desirable to the packaging industry.

The above disclosure is for the purpose of illustrating the present invention and should not be interpreted as limiting the present invention to the particular embodiments described but rather the scope of the present invention should only be limited by the claims which follow and should include those modifications of what is described which would be readily apparent to one skilled in the art.

What is claimed is:

1. A packaging cavity forming web or a packaging covering web formed from a double wall laminate with enhanced puncture resistance comprising:
   a. a first independently manufactured oriented heat shrinkable thermoplastic film;
   b. a second independently manufactured non-heat shrinkable thermoplastic film having a heat shrinkable value of less than 10% in both machine and transverse directions; wherein said first and second independently manufactured thermoplastic films being partially laminated to each other with a polyurethane adhesive such that:
   c. a substantial portion of the surfaces of the two films facing each other are unlaminated;
   d. the laminate is capable of forming a product containing cavity upon being heated and drawn into a mold; and
   e. the unlaminated surface of one of said films is heat sealable.

2. The web of claim 1 wherein the web can be deep drawn.

3. The web of claim 1 wherein less than 50% of said surfaces are laminated to each other.

4. The web of claim 1 wherein the adhesive is present in a repeating pattern.

5. The web of claim 4 wherein said pattern is a hexagon honeycomb or spaced apart circles.

6. The web of claim 4 wherein said first independently manufactured thermoplastic film is biaxially oriented.

7. The web of claim 1 wherein first independently manufactured thermoplastic film has a heat shrinkable value of at least 10% in both machine and transverse directions.

8. The web of claim 7 wherein said first independently manufactured thermoplastic film has a heat shrinkable value of at least 20% in both machine and transverse directions.

9. The web of claim 8 wherein said first independently manufactured thermoplastic film has a heat shrinkable value of at least 30% in both machine and transverse directions.

10. The web of claim 1 wherein at least one of said films includes an oxygen barrier.

11. The web of claim 1 wherein the structures of the two films are different.

12. The web of claim 10 where the two films are biaxially oriented and said second independently manufactured thermoplastic film is annealed.

13. The web of claim 10 wherein both of said films includes an oxygen barrier.

14. The web of claim 1 wherein the surfaces of said films which face each other are heat sealable.

15. The web of claim 1 wherein each of said independently formed films is between about 2 and 24 mil thick.

16. The web of claim 1 wherein the adhesive joining said independently formed films is between about 2 and 5 microns thick.

* * * * *